United States Patent [19]

Yoshino et al.

[11] Patent Number: 5,199,770
[45] Date of Patent: Apr. 6, 1993

[54] BRAKE SWITCH ABNORMALITY DETECTION DEVICE

[75] Inventors: Masato Yoshino; Yoshio Katayama, both of Itami, Japan

[73] Assignee: Sumitomo Electric Industries, Ltd, Osaka, Japan

[21] Appl. No.: 757,998

[22] Filed: Sep. 12, 1991

[30] Foreign Application Priority Data

Sep. 17, 1990 [JP] Japan .................. 2-248294

[51] Int. Cl.⁵ .................. F16D 66/00; B60T 17/18
[52] U.S. Cl. .................. 303/92; 188/1.11; 303/113.4
[58] Field of Search .................. 188/1.11; 303/113 SS, 303/91, 92; 340/468, 479; 200/61.12, 61.89

[56] References Cited

U.S. PATENT DOCUMENTS

| | | | |
|---|---|---|---|
| 4,545,623 | 10/1985 | Sato et al. .................. | 303/92 |
| 4,708,406 | 11/1987 | Takagi et al. .................. | 303/92 X |
| 4,919,496 | 4/1990 | Burgdorf et al. .................. | 303/113 SS |
| 5,005,916 | 4/1991 | Fujioka et al. .................. | 303/103 |

FOREIGN PATENT DOCUMENTS

| | | |
|---|---|---|
| 0328082 | 8/1989 | European Pat. Off. . |
| 0379094 | 7/1990 | European Pat. Off. . |
| 3323807 | 1/1984 | Fed. Rep. of Germany . |
| 67468 | 3/1989 | Japan .................. 188/1.11 |
| 8909152 | 10/1989 | World Int. Prop. O. . |

OTHER PUBLICATIONS

Leiber et al., *Brake Boosters Designed Specifically for Anti-Lock Braking Systems (ABS)*, May 1984.

*Primary Examiner*—Douglas C. Butler
*Assistant Examiner*—Alfred Muratori
*Attorney, Agent, or Firm*—Sandler Greenblum & Bernstein

[57] ABSTRACT

A brake switch abnormality detection device is provided for use in a motorcycle. The device includes brake switches for producing brake signals indicative of the respective operations of the brake switches, an estimated vehicle speed calculation, unit, a brake signal detector for detecting the presence or absence of the brake signals, a comparator for comparing the estimated vehicle speed with a first predetermined speed and a second predetermined speed which is smaller than the first predetermined speed, and an abnormality detector. The abnormality detector detects abnormalities and produces an abnormality signal when the estimated vehicle speed is reduced from the first predetermined speed to the second predetermined speed without any detection of the brake signal.

19 Claims, 14 Drawing Sheets

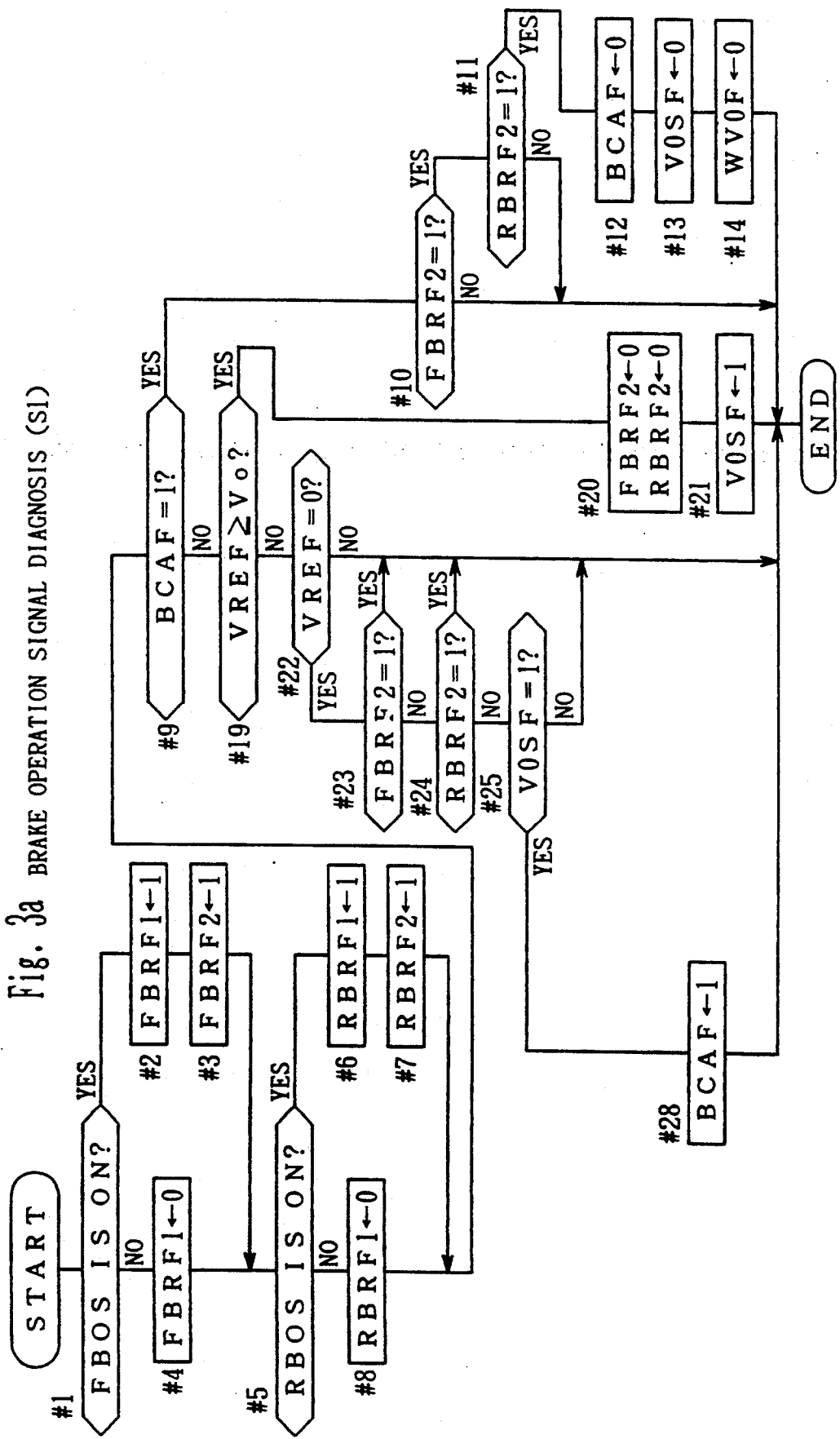

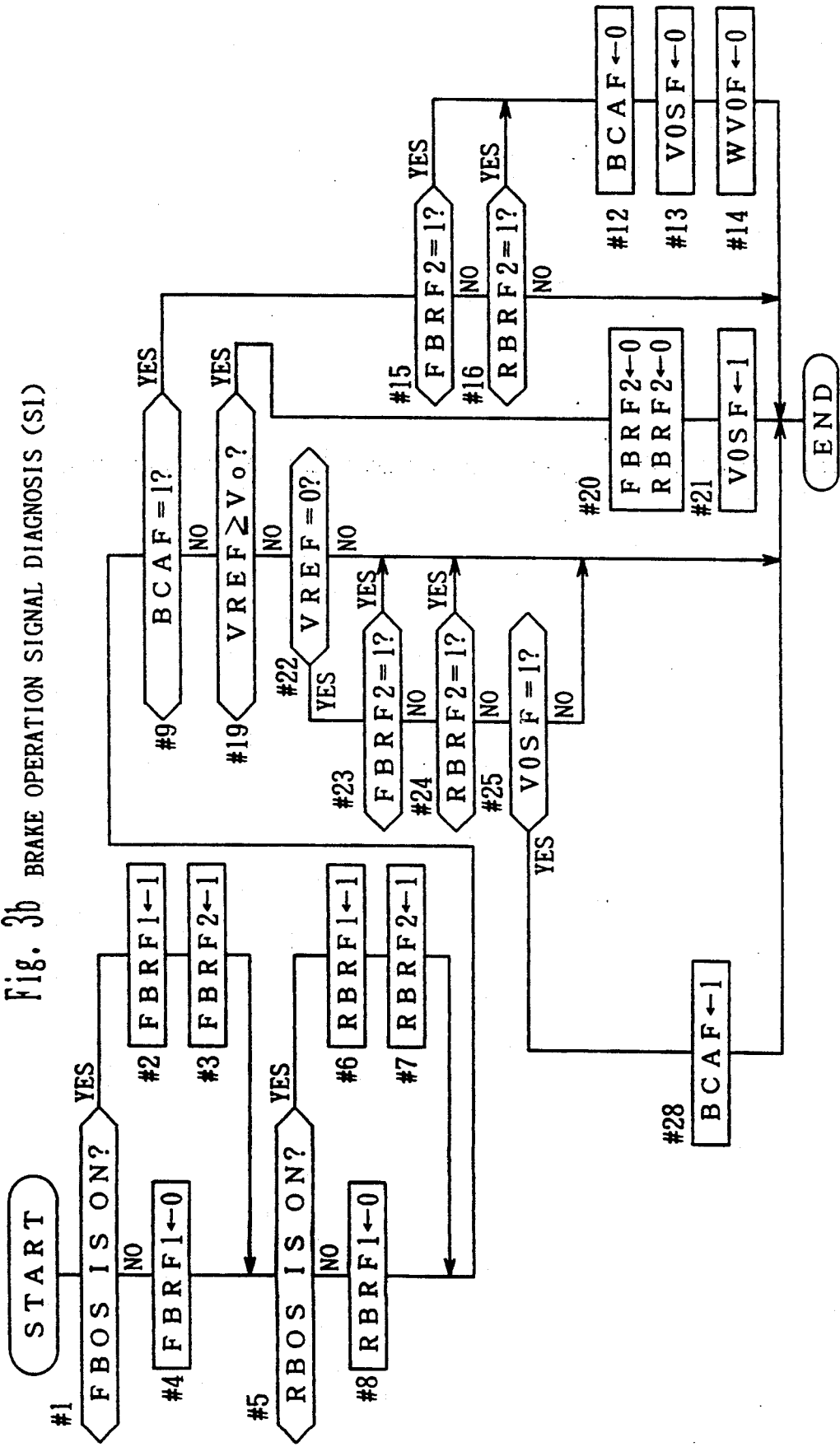

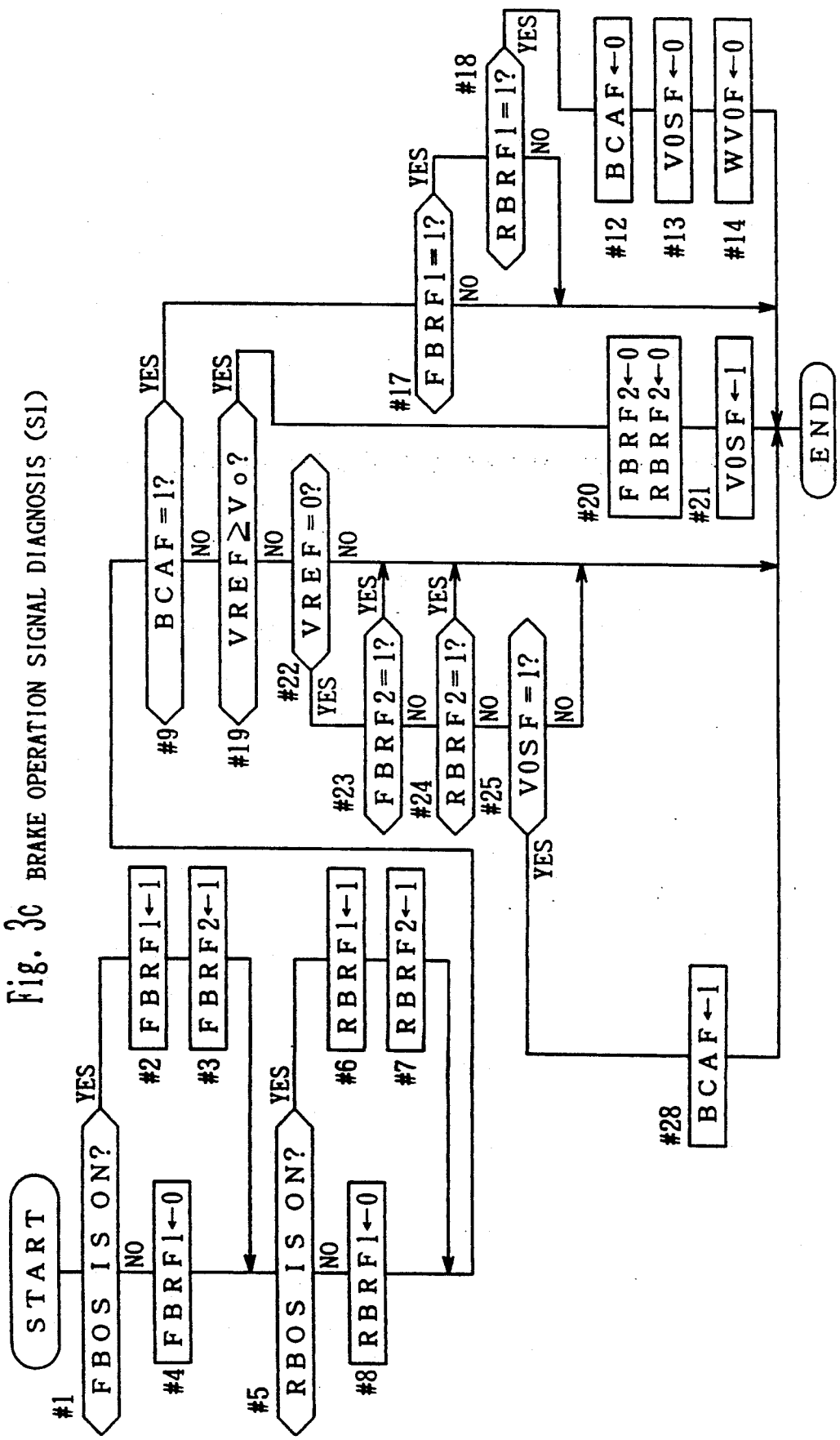

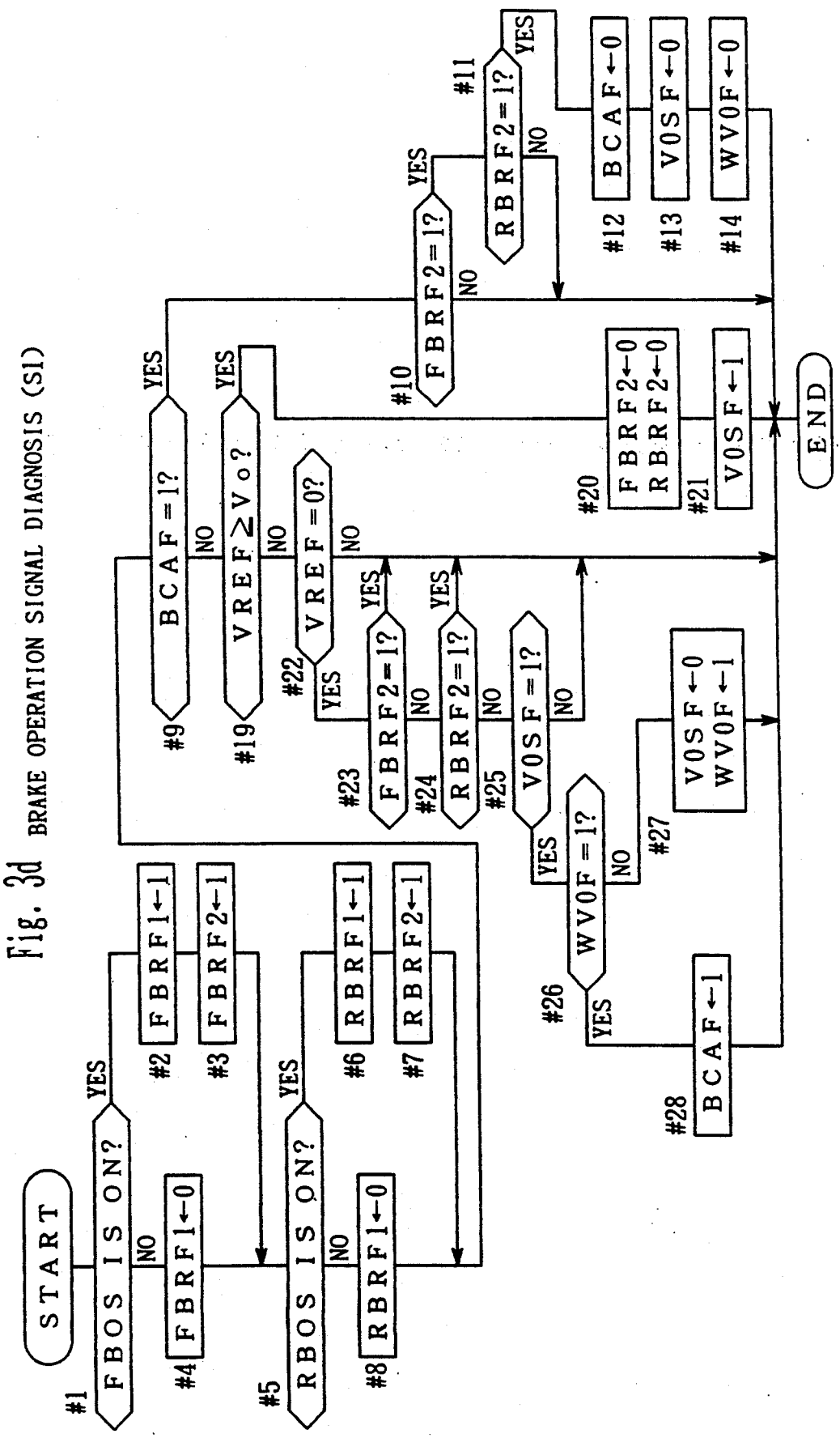

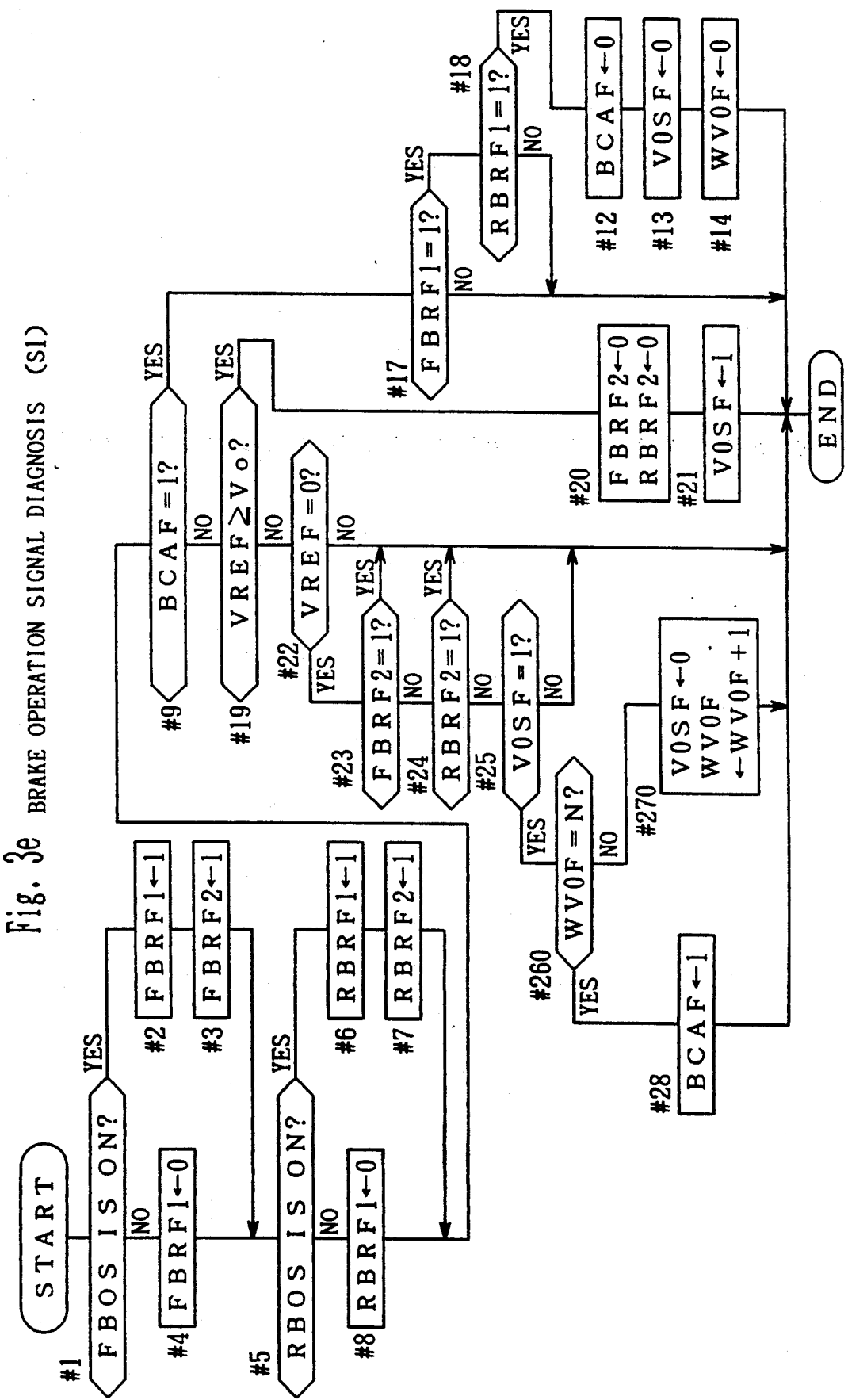

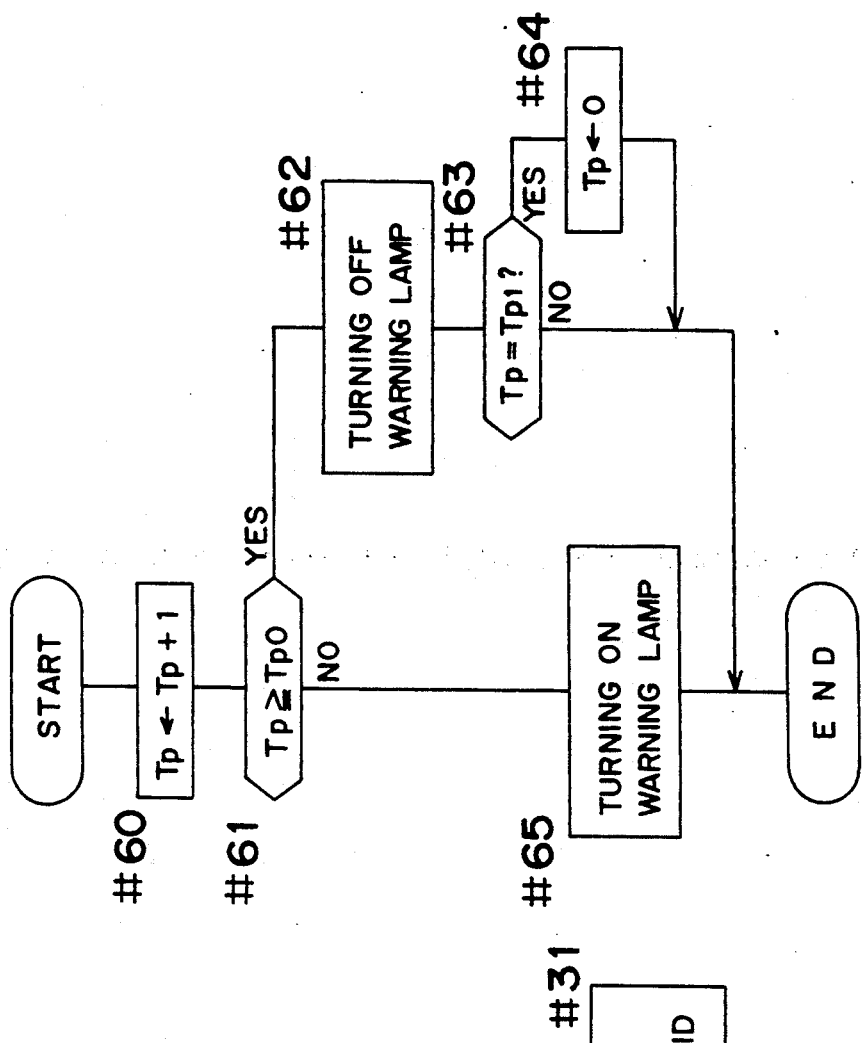
Fig. 6 TURNING-ON-AND-OFF WARNING LAMP (S3-1)
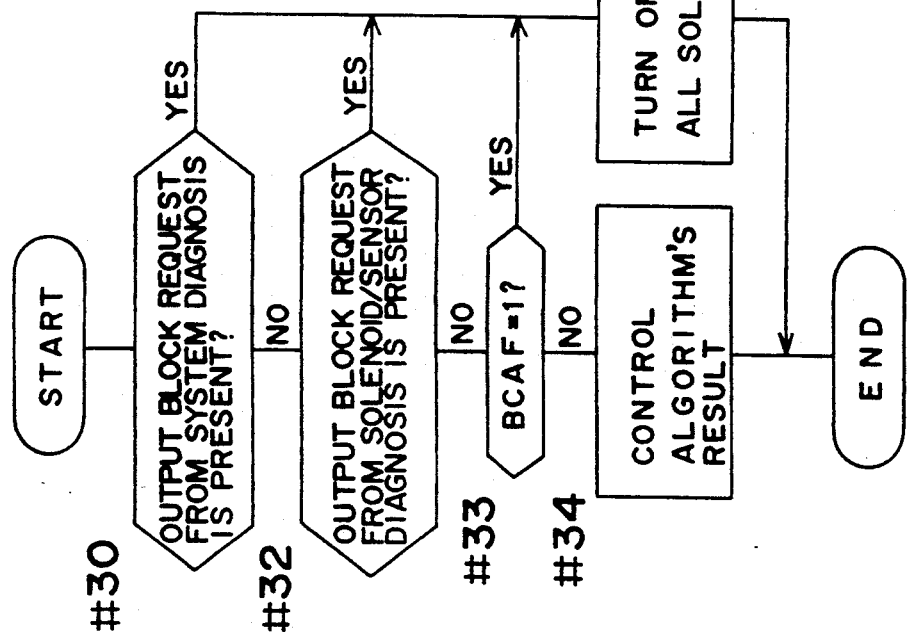
Fig. 4 SOLENOID (S2)

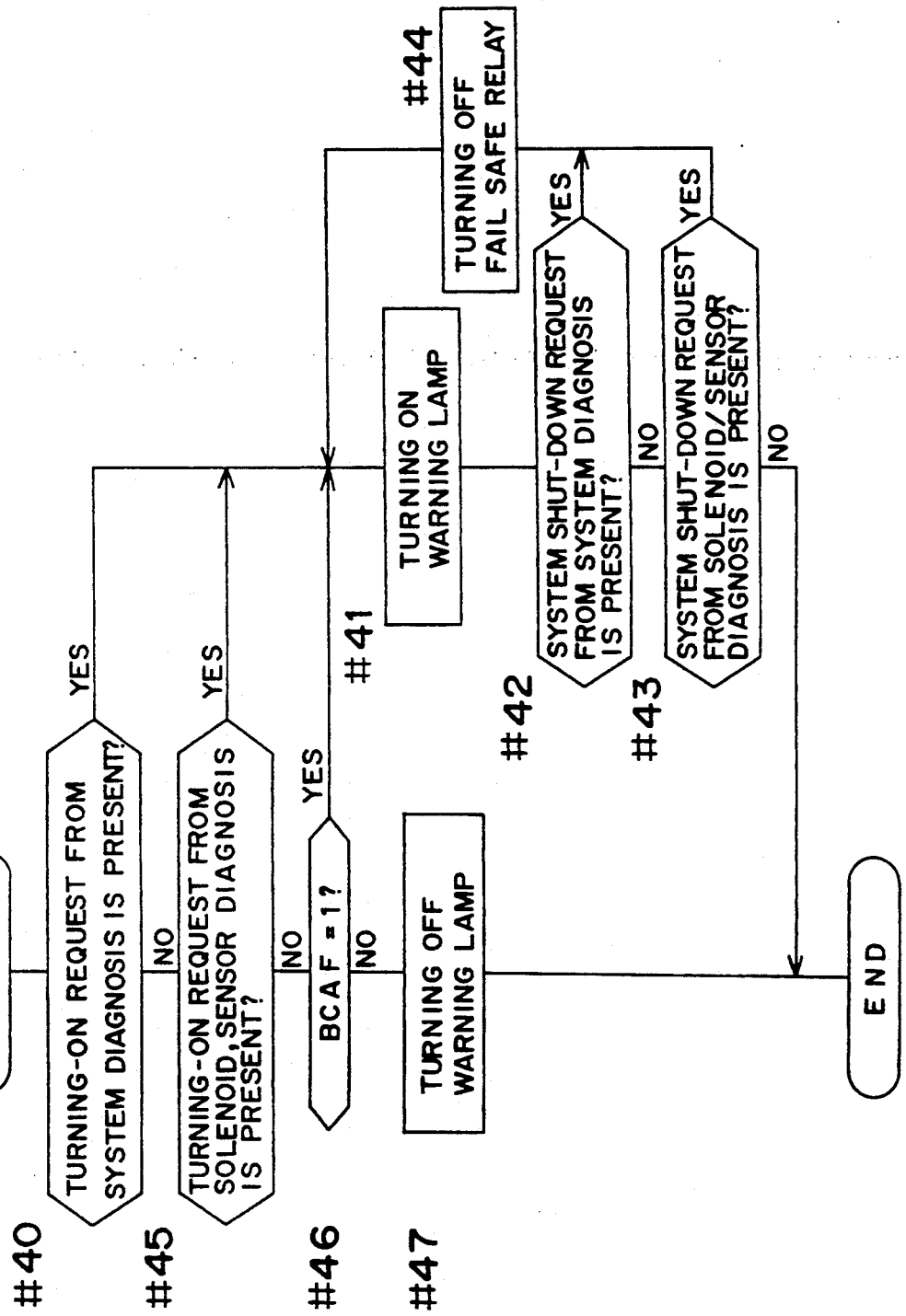

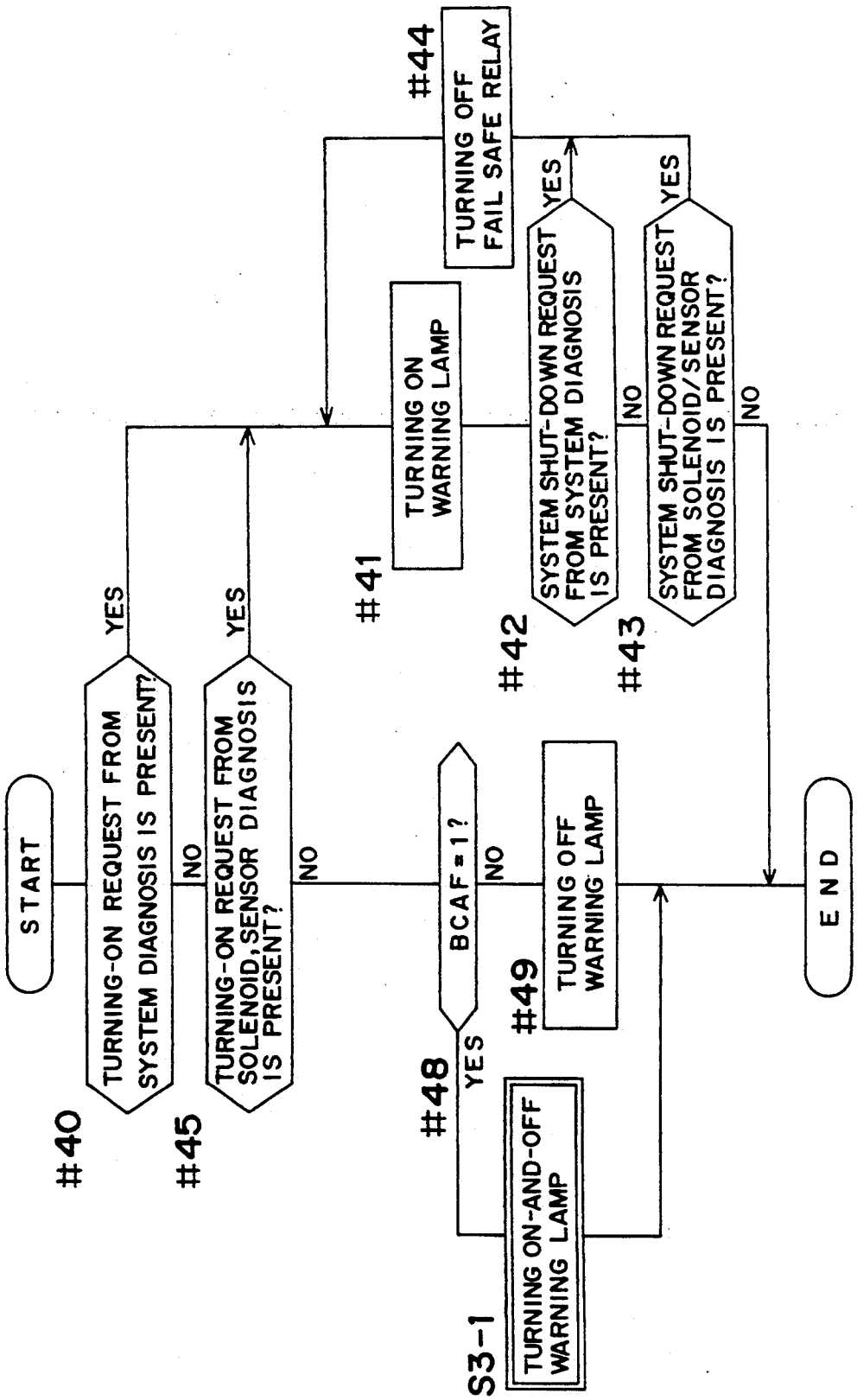

WARNING BUZZER (S4)

BRAKE OPERATION WARNING
LAMP: TURNING-ON-AND-OFF (S5-1)

BRAKE OPERATION WARNING LAMP (S5)

BRAKE OPERATION WARNING LAMP (S5)

BRAKE SWITCH ABNORMALITY DETECTION DEVICE

BACKGROUND OF THE INVENTION

1. Field of the Invention

The present invention relates to a brake switch abnormality detection device which detects whether the brake switches of the motorcycle are operating normally and, more particularly, to a brake switch abnormality detection device suitable for use in an antiskid brake control system (also called antilock control system) for motorcycles.

2. Description of the Prior Art

Conventionally the brake switches on a motorcycle have been used to turn on the tail light, but more recently they have also been used as an information input source for antiskid brake control systems which determine whether antiskid brake control can be applied based on the on/off state of the brake switches.

However, if the on/off operation of the brake switches is not correct, the antiskid brake control system also does not function correctly and safe operation of the motorcycle may not be possible.

Therefore, an object of the present invention is to provide a brake switch abnormality detection device which determines whether the on/off operation of the brake switches is correct or not and which generates a warning signal if an abnormality is detected in the brake switch.

SUMMARY OF THE INVENTION

The present invention has been developed with a view to substantially solving the above described disadvantages and has for its essential object to provide an improved brake switch abnormality detection device.

In order to achieve the aforementioned objective, a brake switch abnormality detection device for use in a motorcycle includes a front and rear wheels, a brake means operatively provided for applying effect to the front and rear wheels, a brake switch means for producing a brake signal during the brake means is operated, a calculation means for calculating an estimated vehicle speed, a detection means for detecting presence and absence of the brake signal, a comparison means for comparing the estimated vehicle speed with a first predetermined speed and a second predetermined speed which is smaller than the first predetermined speed and an abnormality detection means for producing an abnormality signal when the detection means fails to detect the presence of the brake signal during one detection period which is from a time when the estimated vehicle speed falls below the first predetermined speed to a time when the estimated vehicle speed reaches the second predetermined speed.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 3a is a flow chart showing the operation of sub-routine block S1 of FIG. 1;

FIGS. 3b, 3c, 3d and 3e are flow charts showing the operations of alternative embodiments of FIG. 3a, FIG. 4 is a flow chart showing the operation of sub-routine block S2 of FIG. 2b;

FIG. 5a is a flow chart showing the operation of sub-routine block S3 of FIG. 2b;

FIG. 5b is a flow chart showing the operation of an alternative embodiment of FIG. 5a;

FIG. 6 is a flow chart showing the operation of sub-routine block S3-1 of FIG. 5b;

FIG. 8b is a flow chart showing the operation of an alternative embodiment of FIG. 8a;

FIG. 9 is a flow chart showing the operation of sub-routine block S5-1 of FIG. 8a.

DETAILED DESCRIPTION OF THE PREFERRED EMBODIMENTS

Figure 1:
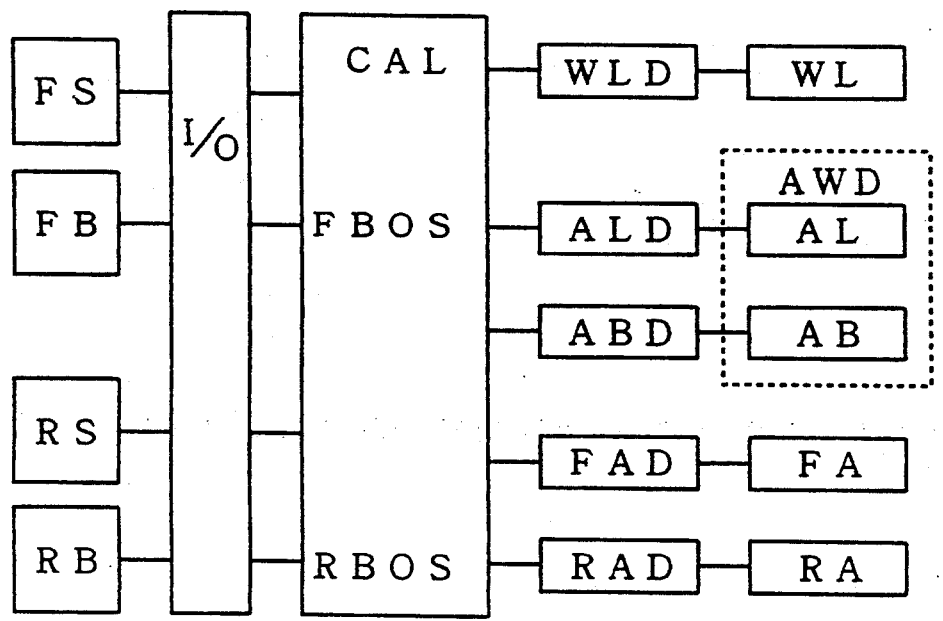
FIG. 1 is a block diagram showing the constitution of a brake switch abnormality detection device in use for a motor cycle.

Referring to FIG. 1, a block diagram of a brake switch abnormality detection device according to a preferred embodiment of the present invention is shown, in which an antiskid brake control device for a motorcycle is incorporated.

As shown in FIG. 1, a brake switch abnormality detection device includes a front wheel speed sensor FS and a rear wheel speed sensor RS for detecting the respective wheel speeds of the front and rear wheels of a motorcycle and producing respective signals indicative of respective wheel speeds. A front brake switch FB and a rear brake switches RB are provided for detecting operation of the front and rear brakes, respectively, and for producing respective signals indicative of the detected operation of front and rear brakes.

The brake switch abnormality detection device further includes: an input interface I/O for receiving signals from the wheel speed sensors FS and RS and the brake switches FB and RB, and producing respective signals indicative of wheel speed and brake switch operation; a calculation unit CAL for calculating an estimated vehicle speed VREF based on the signals from the wheel speed sensors FS and RS and the brake switches FB and RB input through the input interface I/O, for detecting any abnormality in a brake indication system, and for determining a change in the brake pressure of the wheels to produce respective signals indicative of respective change of brake pressure; a warning lamp WL connected to the calculation unit CAL through a warning lamp driver WLD; an antilock warning lamp AL connected to the calculation unit CAL through an antilock warning lamp driver ALD; an antilock warning buzzer AB connected to the calculation unit CAL through an antilock warning buzzer driver ABD; a front brake actuator FA which controls the brake pressure of the front brake and is connected to the calculation unit CAL through a front brake actuator driver FAD; and a rear brake actuator RA which controls the brake pressure of the rear brake and is connected to the calculation unit CAL through a rear brake actuator driver RAD. It is to be noted that the antilock warning lamp AL and the antilock warning buzzer AB constitutes an antilock warning device AWD. It is preferable that the calculation unit CAL is comprised of a microcomputer.

Figure 2A:
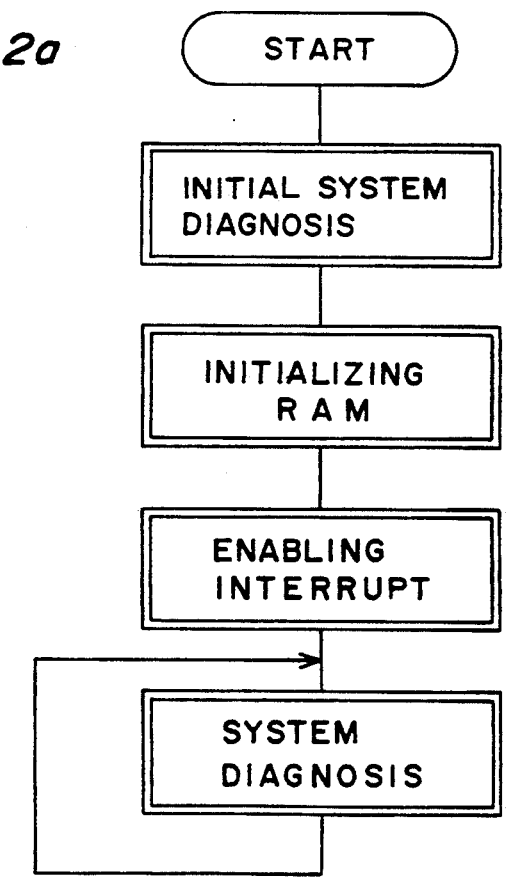
FIGS. 2a, 2b, and 2c are flow charts showing the operation of the brake switch abnormality detection device of FIG. 1.
Figure 2B:
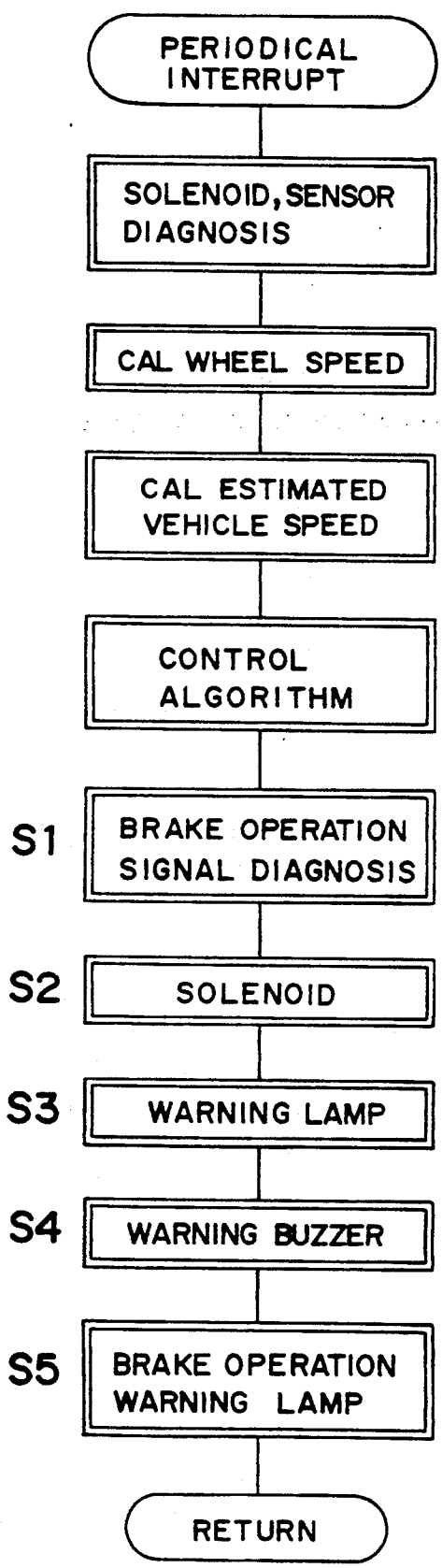
Figure 2C:
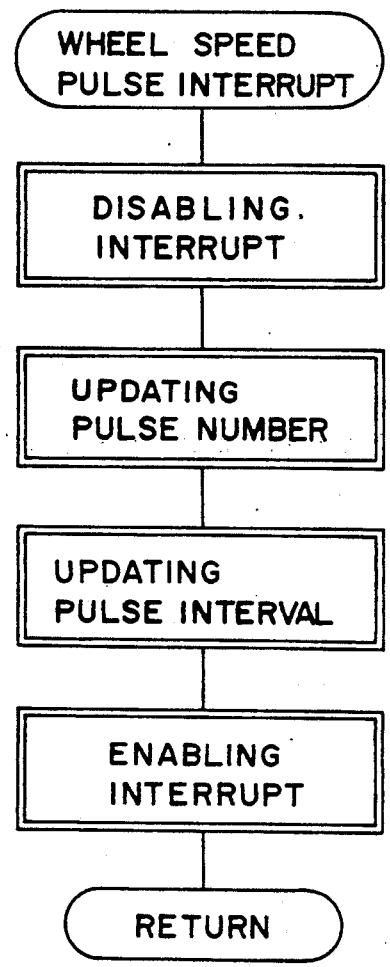

Referring to FIGS. 2a, 2b, and 2c, the operation of the brake switch abnormality detection device of FIG. 1 used in an antiskid brake control system is described hereinbelow. The blocks marked by a double outline represent sub-routine blocks.

As shown in FIG. 2a, in the first sub-routine block "INITIAL SYSTEM DIAGNOSIS", a diagnostic test is carried out to confirm the operation and performance of such components as a CPU, a solenoid, and a motor that constitute the antiskid brake control system when the antiskid brake control system is energized for the first time.

In the next sub-routine block, "INITIALIZING RAM", a RAM is initialized and the various system variables are reset to zero or set to a predetermined initial value.

Then in the next sub-routine block, "ENABLING INTERRUPT", an enabling interrupt signal is produced to enable a "PERIODICAL INTERRUPT" process and a "WHEEL SPEED PULSE INTERRUPT" process described later with reference to FIGS. 2b and 2c.

Thereafter the next sub-routine block, "SYSTEM DIAGNOSTIC", is repeated eternally, and in the meantime, the wheel speed pulse interrupt process is enabled until a system failure occurs.

Referring to FIG. 2b, the operation "PERIODICAL INTERRUPT" process is shown. The periodical interrupt process is executed at a predetermined timing after the "ENABLING INTERRUPT" sub-routine block in FIG. 2a enables interrupt.

In the first sub-routine block "SOLENOID, SENSOR DIAGNOSIS" of the "PERIODICAL INTERRUPT", it is confirmed whether the solenoids, sensors, and other components are functioning according to the system commands. After these self-diagnosis are completed, the wheel speeds are calculated based on the signals from the wheel speed sensors FS and RS in the next sub-routine block, "CAL WHEEL SPEED".

The estimated vehicle speed VREF is then calculated in the next sub-routine block, "CAL ESTIMATED VEHICLE SPEED".

In the next sub-routine block, "CONTROL ALGORITHM", the output to the solenoid for the brake actuator of each wheel is determined based on a specified control algorithm.

In the next sub-routine block S1, "BRAKE OPERATION SIGNAL DIAGNOSIS", the brake operation signal is diagnosed. The diagnostic operation will be described in detail later with reference to FIG. 3a.

In sub-routine block S2, "SOLENOID", signals for solenoids for controlling brake actuators FA and RA are produced. The operation will be described in detail later with reference to FIG. 4.

In sub-routine block S3, "WARNING LAMP", a signal for warning lamp WL is produced. The operation will be described in detail later with reference to FIG. 5a.

In sub-routine block S4, "WARNING BUZZER", a signal for the warning buzzer AB is determined. The operation will be described in detail later with reference to FIG. 7.

In sub-routine block S5, "BRAKE OPERATION WARNING LAMP", a signal for a brake operation warning lamp is produced. The operation will be described in detail later with reference to FIG. 8.

Referring to FIG. 2c, the operation of "WHEEL SPEED PULSE INTERRUPT" process is shown. When the "WHEEL SPEED PULSE INTERRUPT" is entered, the "PERIODICAL INTERRUPT" operation is disabled to ensure the complete operation of the "WHEEL SPEED PULSE INTERRUPT". While the "WHEEL SPEED PULSE INTERRUPT" is being carried out, data representing the wheel speed pulse number and the data representing the wheel speed pulse interval are renewed. After such data are renewed, it is permitted to resume the interrupted "PERIODICAL INTERRUPT" process from the point at which it was interrupted.

The preferred embodiment of the present invention will be described first hereinbelow with reference to FIGS. 3a, 4, 5a, 7, 8a, and 9, after which alternative embodiments will be described with reference to FIGS. 3b, 3c, 3d, 3e, 5b, 6, and 8b.

Referring to FIG. 3a, the operation of sub routine block S1, "BRAKE OPERATION SIGNAL DIAGNOSIS", in FIG. 2b is shown.

At step #1, it is judged whether a front brake operation signal FBOS is ON or not. If "FBOS IS ON?" is judged as "YES" meaning that the front brake switch FB is turned on, the procedure advances to step #2 where a front brake ON flag FBRF1 is set to one. The procedure further advances to step #3 where a front brake ON experience flag FBRF2 is then set to one, and then further to step #5.

However, if "FBOS IS ON?" is judged as "NO" at step #1 meaning that the front brake switch FB is turned off, the procedure advances to step #4 where the front brake ON flag FBRF1 is reset to zero. Then step #5 is carried out.

Then at step #5, it is judged whether a rear brake operation signal RBOS is ON or not. If "RBOS IS ON?" is judged as "YES" meaning that the rear brake switch RB is turned on, the procedure advances to step #6 where a rear brake ON flag RBRF1 is set to one. The procedure advances to step #7 where a rear brake ON experience flag RBRF2 is then set to one.

However, if "RBOS IS ON?" is judged as "NO" at step #5 meaning that the rear brake switch RB is turned off, the procedure advances to step #8 where the rear brake ON flag RBRF1 is reset to zero.

At step #9, it is judged whether the warning flag BCAF is set to one or not. If "BCAF=1?", the procedure advances to step #10 where it is judged whether the front brake ON experience flag FBRF2 is set to one or not. If it is judged as "NO" at step #10, the sub-routine block S1 terminates and the procedure advances to sub-routine block S2. If judged as "YES" at step #10, the procedure advances to step #11.

At step #11 it is judged whether the rear brake ON experience flag RBRF2 is set to one or not. If "NO", the sub-routine block S1 terminates and the procedure advances to sub-routine block S2. If it is judged that "RBRF2=1", the procedure advances to step #12.

At step #12 the warning flag BCAF is reset to zero, at step #13 a predetermined speed experience flag V0SF is reset to zero, at step #14 a predetermined number count flag WV0F is reset to zero, and the sub-routine block S1 terminates and the procedure advances to sub-routine block S2.

However, if it is judged as "BCAF≠1" at step #9, i.e., it is judged that the warning flag BCAF is not set, the procedure advances to step #19 where it is judged whether the estimated vehicle speed VREF is equal to or greater than a predetermined vehicle speed Vo or not.

If judged as "VREF≧Vo" at step #19, the procedure advances to step #20 where the front brake ON experience flag FBRF2 and rear brake ON experience flag RBRF2 are reset to zero, and then at step #21 the predetermined speed experience flag V0SF is set to one then, the sub-routine block S1 terminates and the procedure advances to sub-routine block S2.

However, if judged as "VREF<Vo" is at step #19, the procedure advances to step #22, where it is judged whether the estimated vehicle speed VREF is zero or not. If "VREF≠0" at step #22, i.e., meaning that the vehicle is moving, the sub-routine block S1 terminates and the procedure advances to sub-routine block S2. If "VREF=0" at step #22, meaning that the vehicle is not moving, the procedure advances to step #23 where it is judged whether the front brake ON experience flag FBRF2 is set to one or not. It is to be noted that, at step #22 in the above described embodiment, the estimated vehicles speed VREF is compared with zero, but can be compared with any other value, which is nearly equal to zero, at which value it is possible to consider that the vehicle is about to stop.

If "FBRF2=1" at step #23, the sub-routine block S1 terminates and the procedure advances to sub-routine block S2. But, if "FBRF2≠1", the procedure advances to step #24 where it is judged whether the rear brake ON experience flag RBRF2 is set to one or not.

If "RBRF2=1" at step #24, the sub-routine block S1 terminates and the procedure advances to sub-routine block S2. The procedure advances to sub-routine block S2. But, if "RBRF2≠1" at step #24, the procedure advances to step #25 where it is judged whether the predetermined speed experience flag V0SF is set to one or not.

If "V0SF≠1" at step #25, the sub-routine block S1 terminates and the procedure advances to sub-routine block S2. But, if "V0SF=1", the procedure advances to step #28 where the warning flag BCAF is set to one, and then the sub-routine block S1 terminates and the procedure advances to sub-routine block S2. As apparent from the forgoing description, the procedure advances from step #25 to #28 in the case where the vehicle is decelerated from the first predetermined vehicle speed Vo to the second predetermined vehicle speed, which is zero in the above described embodiment, without any braking operation. Thus, when the operation is so carried out as to pass step #28, it is so defined that the abnormality is detected. Thus at step #28, a flag BCAF is set for making the abnormality detecting device ready for producing a warning.

Referring to FIG. 4, the operation of sub-routine block S2, "SOLENOID", in FIG. 2b is shown.

At steps #30, it is judged whether an output block request from the system diagnosis is present or not.

At steps #32, it is judged whether an output block request from the solenoid/sensor diagnosis is present or not.

At step #33, it is judged whether the warning flag BCAF is set to one or not.

If the result is "YES" at any one of steps #30, #32, and #33, a TURN OFF signal is produced for all solenoids at step #31 so as to prevent the front and rear brake actuators FA and RA from operating. The sub-routine block S2 then terminates and the procedure advances to sub-routine block S3.

If the results are "NO" at all of steps #30, #32 and #33, the procedure advances to step #34 where the signals for carrying out the antiskid control operation are calculated. The sub-routine block S2 then terminates and the procedure advances to sub-routine block S3.

Referring to FIG. 5a, the operation of sub-routine block S3, "WARNING LAMP", in FIG. 2b is shown.

At step #40, it is judged whether a turning-on request for the warning lamp WL from the system diagnosis is present or not.

At step #45, it is judged whether a turning-on request for the warning lamp WL from the solenoid, sensor diagnosis is present or not.

At step #46, it is judged whether the warning flag BCAF is set to one or not.

If the results are "NO" at all of steps of #40, #45, and #46, the procedure advances to step #47 where a signal for turning off the warning lamp WL is produced. The sub-routine block S3 then terminates and the procedure advances to sub-routine block S4.

However, if the result is "YES" at any one of steps #40, #45, and #46, a turning on signal for the warning lamp WL is produced at step #41. Then the procedure advances to step #42.

At step #42, it is judged whether a system shut-down request from the system diagnosis is present or not.

If "NO" at step #42, the procedure advances to step #43 where it is judged whether a system shut-down request from the solenoid, sensor diagnosis is present or not. If "NO" at step #43, the sub-routine block S3 terminates and the procedure advances to sub-routine block S4.

However, if it is judged as "YES" at either step #42 or #43, the procedure advance to step #44 where a signal to turn off a fail-safe relay is produced to stop the operation of actuators. After then, the procedure returns to step #41.

Figure 7:
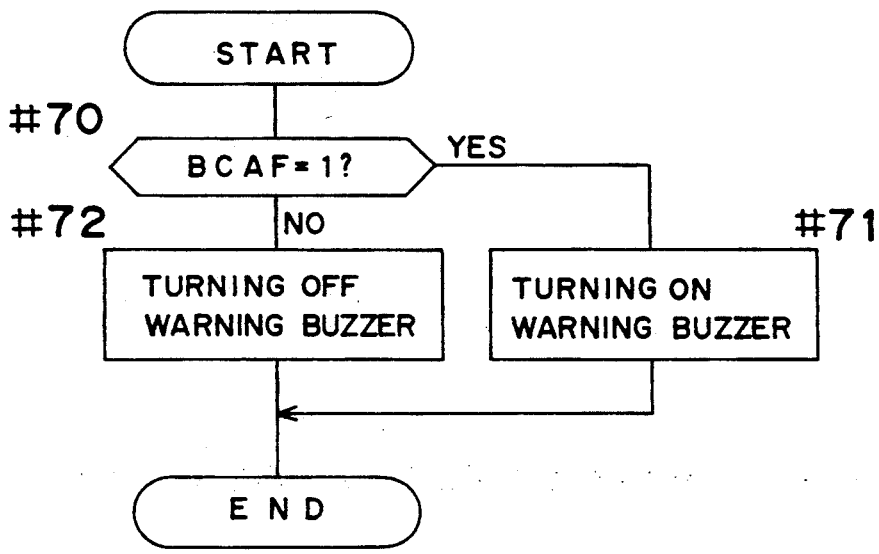
FIG. 7 is a flow chart showing the operation of sub-routine block S4 of FIG. 2b.

Referring to FIG. 7, the operation of sub-routine block S4, "WARNING BUZZER", depicted in FIG. 2b is shown.

At step #70, it is judged whether the warning flag BCAF is set to one or not. If "BCAF=1", the procedure advances to step #71 where a signal for turning on the antilock warning buzzer AB is produced. The sub-routine block S4 then terminates and the procedure advances to sub-routine block S5.

However, if "BCAF≠1" at step #70, the procedure advances to step #72 where a signal for turning off the warning buzzer AB is produced. The sub-routine block S4 then terminates and the procedure advances to sub-routine block S5.

Figure 8A:
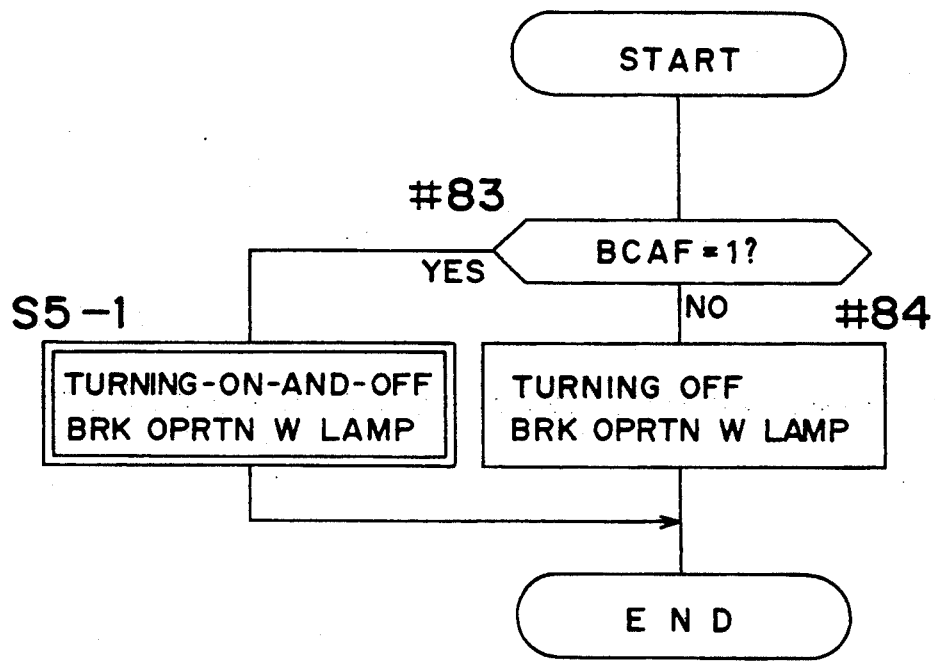
FIG. 8a is a flow chart showing the operation of sub-routine block S5 of FIG. 1.

Referring to FIG. 8a, the operation of sub-routine block S5, "BRAKE OPERATION WARNING LAMP", depicted in FIG. 2b is shown.

At step #83, it is judged whether the warning flag BCAF is set to one or not. If "BCAF=1", the procedure advances to sub-routine block S5-1 where a brake operation warning lamp turning-on-and-off signal is produced to blink the antilock warning lamp AL or other suitable lamp for giving a warning. The sub-routine block S5 then terminates.

However, if "BCAF≠1", at step #83, the procedure advances to step #84 where a brake operation warning lamp turning off signal is produced to turn off the antilock warning lamp AL or other suitable warning lamp. The sub-routine block S5 then terminates.

Figure 9:
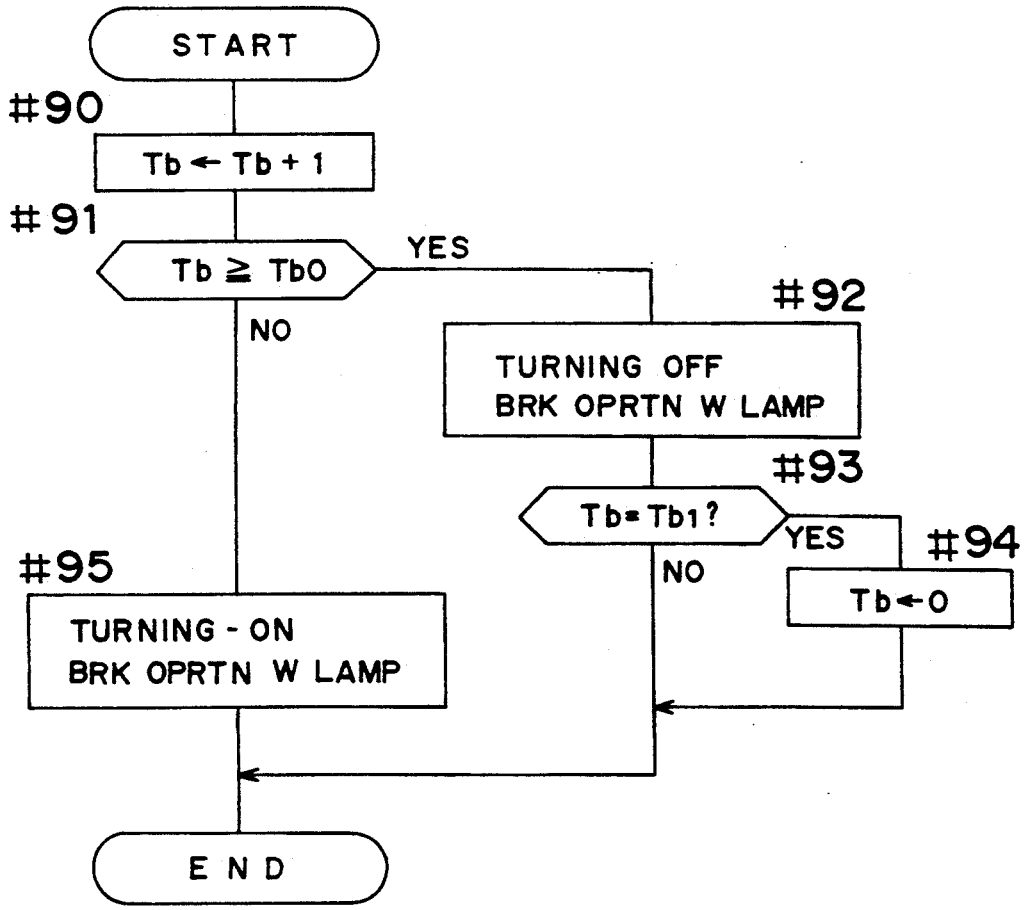

Referring to FIG. 9, the operation of sub-routine block S5-1, "BRAKE OPERATION WARNING LAMP: TURNING-ON-AND-OFF", mentioned in FIG. 8a is shown.

At step #90, the flashing timer Tb is incremented by one and the procedure advances to step #91 where it is judged whether the flashing time Tb is equal to or greater than a predetermined value Tb0 which is a positive value provided to determine a period for the antilock warning lamp AL or the brake operation warning lamp being turned on and lit.

If "Tb<Tb0" at step #91, meaning that the flashing timer Tb is less than the positive predetermined value Tb0, the procedure advances to step #95 where a signal for turning-on the brake operation warning lamp is produced, and sub-routine block S5-1 is terminated.

However, if "Tb≧Tb0" at step #91, meaning that judged that the flashing timer Tb is equal to or greater than the positive predetermined value Tb0, the procedure advances to step #92 where a signal for turning off the brake operation warning lamp is produced. The procedure then advances to step #93.

At step #93, it is judged whether the flashing timer Tb is equal to a predetermined value Tb1 which is a positive value for determining a period for the brake operation warning lamp being turned off. If "Tb≧Tb1", the sub-routine block S5-1 terminates. But, if "Tb=Tb1", the procedure advances to step #94 where the flashing timer Tb is reset to zero, and after which the operation of sub-routine block S5-1 terminates.

In other words, the antilock warning lamp AL or the brake operation warning lamp lights steady until the flashing timer Tb is incremented to Tb0, and is off from a time when Tb exceeds Tb0 until a time when Tb becomes equal to Tb1. It is to be noted that when Tb becomes equal to Tb1, Tb is reset to zero so that the lamp is controlled to repeat on and off at timings defined by the predetermined values Tb0 and Tb1.

Next, the specific operation of the preferred embodiment in the detection of abnormality in the motorcycle brake operation signal system is described hereinbelow with reference to FIG. 10 and FIG. 11.

Figure 10:
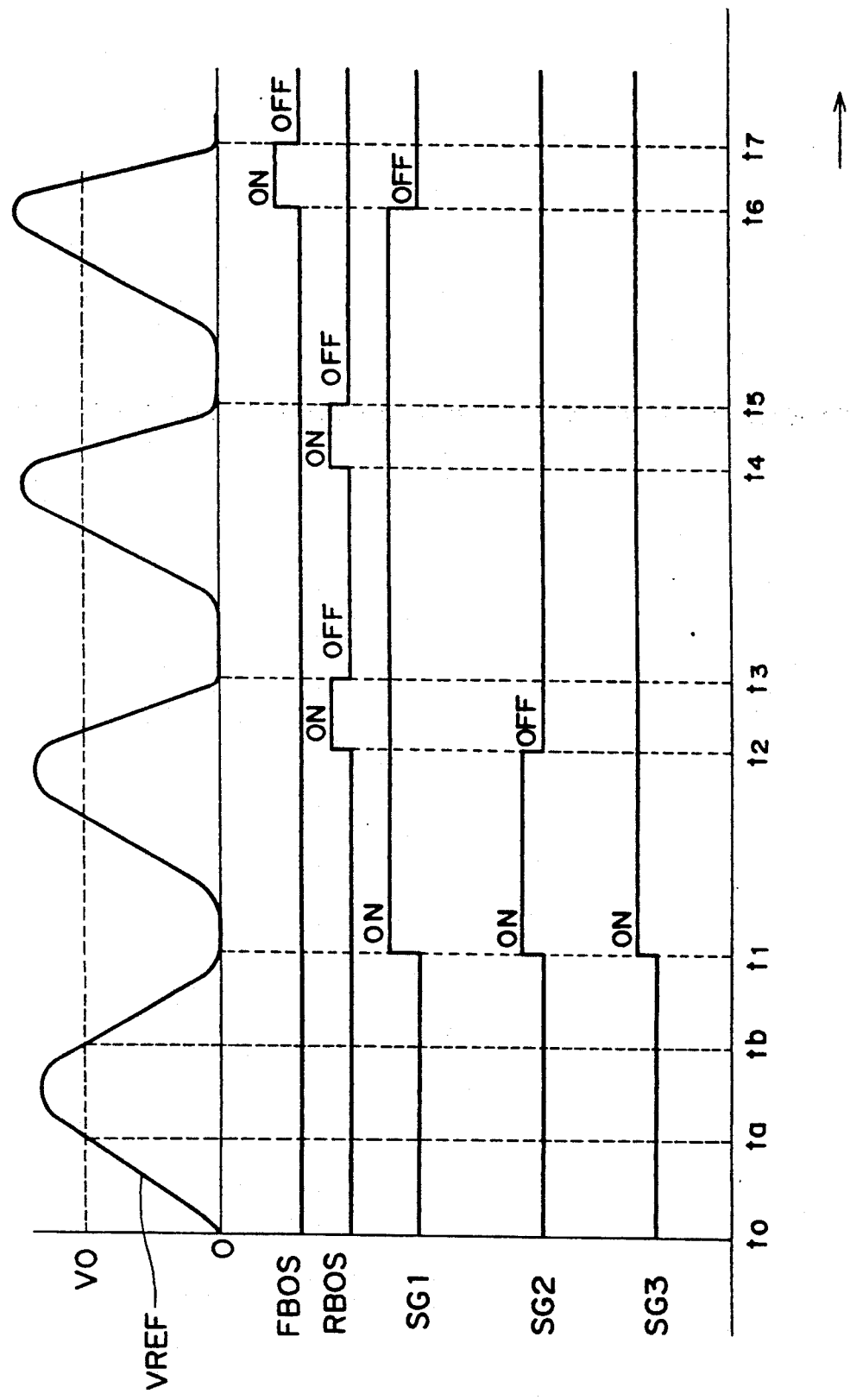
FIGS. 10 and 11 are graphs showing the signals produced by the brake switch abnormality detection device as the brakes are operated during motorcycle travel.

Referring to FIG. 10, waveforms are shown of the estimated vehicle speed VREF, the front and rear brake operation signals FBOS and RBOS through four operating cycles in which the motorcycle accelerates from a stopped state (t0) to a speed exceeding a predetermined vehicle speed Vo (from 30-50 km/hr in the embodiment) and then stops in each cycle. It is to be noted that signal SG1 is the warning flag BCAF, and signals SG2 and SG3 are alternative examples of the warning flag BCAF. It is to be noted that the predetermined vehicle speed Vo which is 30-50 Km/hr employed in the above described embodiment is recommendable for general motorcycles, but can be any other speed, at which speed it is considerable that the various motorcycles run usually.

From t0 to t1

At time t0 the motorcycle is stopped. Thus, the control advances through steps #1, 4, 5, 8, 9, 19, 22, 23, 24, 25 (shown in FIG. 3a), 30, 32, 33, 34 (shown in FIG. 4), 40, 45, 46, 47 (shown in FIG. 5a), 70, 72 (shown in FIG. 7), 83, and 84 (shown in FIG. 8a), and the "PERIODICAL INTERRUPT" process is completed. Thus, the warning flag BCAF is held in the reset to zero state.

During a time from t0 to ta, the estimated vehicle speed VREF is not zero but below the predetermined vehicle speed Vo. It is therefore judged as "NO" at step #22 (FIG. 3a), causing the procedure to advance to step #30, whereafter the control is the same as at the time t0.

During a time from ta to tb, because the estimated vehicle speed VREF exceeds the predetermined vehicle speed Vo, it is judged as "YES" at step #19. The procedure thus advances to step #20 and the front brake ON experience flag FBRF2 and the rear brake ON experience flag RBRF2 are reset to zero, the predetermined speed experience flag V0SF is also set to one (step #21), and the procedure advances to step #30, whereafter the control is the same as at time t0.

During a time from tb to t1, because the estimated vehicle speed VREF is between zero and the predetermined vehicle speed Vo, it is judged as "NO" at both steps #19 and #22, and the procedure advances to step #30.

Time t1

At time t1, the control advances through steps #1, 4, 5, 8, 9, and 19, after which it is judged as "YES" at step #22 because the estimated vehicle speed VREF is zero, and the procedure then advances to step #23.

Because the front brake ON experience flag FBRF2 is not set, it is judged as "NO" at step #23, and the procedure advances to step #24.

Furthermore, because the rear brake ON experience flag RBRF2 is not set, it is judged as "NO" at step #24, and the procedure advances to step #25. It is judged as "YES" at step #25 because the predetermined speed experience flag V0SF was already set to one at step #21 during a time from ta and tb, and the procedure thus advances to step #28.

At step #28, the warning flag BCAF is set to one. The warning flag BCAF is a flag which is set to one in the abnormal case, that is when the motorcycle travelling at the predetermined vehicle speed Vo stops without any detection of braking operation signals FBOS and RBOS. The procedure then advances through steps #30, 32, and 33 to step #31.

At step #31, a TURN OFF signal is produced for all solenoids. Step #31 is recommendable because operation of the antiskid brake control system after an abnormality as described above is detected is potentially dangerous. Thus, since the procedure does not enter the step #34, which is provided for effecting the antiskid brake control operation, the antiskid brake control operation will be suspended.

The control then advances through steps #40, 45, and 46 to step #41, at which step the warning lamp turn-on signal is produced. Through steps #42 and #43 then the procedure advances to step #70. Because the warning flag BCAF is set at step #28, the control advances to step #71 where the warning buzzer ON signal is produced. Similarly, through step #83 the control advances to the sub-routine block S5-1 at which the signal for turning-on-and-off the brake operation warning lamp is produce.

It is to be noted that when a system abnormality is detected by a brake switch abnormality detection device according to the preferred embodiment, operation of the antiskid brake control system is suspended and the warning lamp AL is lit simultaneously to sound the warning buzzer AB and to blink the brake operation warning lamp, thus warning the driver, but it is also acceptable to use only one of these warning operations or to use plural warnings in any combination.

Time t2

From time t1 to t2, the control advances through steps #1, 4, 5, 8, 9, and 10 to step #30, whereafter the control is the same as at time t1.

At time t2, after steps #1 through #5, the control advances to step #6 where the rear brake ON flag RBRF1 is set.

At step #7 the rear brake ON experience flag RBRF2 is set and, the control advances to step #9 and through step #10 to step #30, whereafter the same control sequence as at time t1 is executed.

Time t3

Time t3 shows that point where the rear brakes operated at time t2 are released as the estimated vehicle speed VREF becomes zero.

Specifically, the control advances through steps #1, 4, and 5 to step #8, where the rear brake ON flag RBRF1 is reset to zero. The control then advances from step #9 to step #10, where it is judged as "NO" and the procedure advances to step #30. After step #30, the control is the same as that at time t1.

Times t4 and t5

The control sequences at times t4 and t5 are the same as at times t2 and t3, respectively.

Time t6

At time t6 it is assumed that the front brake operation signal is ON for the first time since the motorcycle started after time t0.

Because the front brake operation signal is ON, it is judged as "YES" at step #1, advancing the control to steps #2 and #3. At step #2, the front brake ON flag FBRF1 is set, and at step #3 the front brake ON experience flag FBRF2 is set.

The control advances through steps #5, 8, 9, and 10, where it is judged as "YES" and the control advances to step #11.

Since the rear brake ON experience flag RBRF2 was also set at step #7 at time t4, it is judged as "YES" at step #11 and the control advances to step #12, where the warning flag BCAF is reset to zero and the signal SG1 becomes OFF.

The control thus advances to step #13, where the predetermined speed experience flag V0SF is reset to zero, and the predetermined number count flag WV0F is then reset to zero at step #14. Because the warning flag BCAF is reset to zero, the control advances through step #30 and #32 to step #33. It is judged as "NO" at step #33 and the procedure advances to step #34.

At step #34, the signals representing determination according to the control algorithm is produced, causing the blocking of antiskid brake control started at time t1 to be canceled. The control then advances through step #40, #45 and #46 to step #47, where the warning lamp off signal is produced. The warning lamp WL thus has been turned on at time t1 is therefore turned off, and the control advances to step #70.

Furthermore, the warning buzzer off signal is produced at step #72, causing the warning buzzer AB which started buzzering at time t1 to be turned off, and the control advances to step #83.

Also, the brake operation warning lamp off signal is produced at step #84, causing the brake operation warning lamp which started blinking at time t1 to be turned off, and terminating the interrupt process.

Time t7

Time t7 shows that point where the front brake operated at time t6 is released and the estimated vehicle speed VREF becomes zero.

Specifically, the control advances through steps #1, 4, 5, 8, 9, 19, and 22 to step #30, whereafter the control is the same as after step #30 at time t6.

As thus described hereinabove, a brake switch abnormality detection device according to the preferred embodiment of the present invention detects an abnormality and produces a warning when the motorcycle stops without any detection of a braking operation, and cancels the warning when the front brake operation signal and the rear brake operation signal are thereafter detected, simultaneously or at different occasions.

Alternative Embodiments

Referring to FIG. 3b, a flow chart for an alternative embodiment of the present invention shown in FIG. 3a is shown. Specifically, steps #10 and #11 in FIG. 3a are replaced by steps #15 and #16 shown in FIG. 3b.

According to this alternative embodiment, the warning is canceled when either the front brake operation signal FBOS or the rear brake operation signal RBOS is detected as shown by the warning flag BCAF expressed as signal SG2 in FIG. 10.

Referring to FIG. 3c, a flow chart for another alternative embodiment of the present invention shown in FIG. 3a is shown. Specifically, steps #10 and #11 in FIG. 3a are replaced by steps #17 and #18 in FIG. 3c.

According to this alternative embodiment, the warning is not canceled unless the front brake operation signal FBOS and the rear brake operation signal RBOS are detected simultaneously as shown by the warning flag BCAF expressed as signal SG3 in FIG. 10.

Referring to FIG. 3d, a flow chart for further another alternative embodiment of the present invention which is shown in FIG. 3a is shown. Specifically, steps #26 and #27 are added to the flow chart in FIG. 3a.

In the alternative embodiment, since steps #26 and #27 are added, an abnormality is detected: and a warning is produced when the motorcycle stops without any detection of the brake operation signals FOBS and RBOS during two successive motorcycle stopping operations, each stopping operation being defined such that the motorcycle is decelerated from the first predetermined speed Vo to the second predetermined speed. When the brake operation signal FOBS or RBOS is not detected during the two successive motorcycle stopping operations, a warning flag BCAF expressed as signal SG5 in FIG. 11 is produced.

Referring to FIG. 3e, a flow chart of yet another embodiment of the present invention is show, which can be employed in place of the flow chart shown in FIG. 3a. Specifically, steps #10 and #11 in FIG. 3a are replaced by steps #17 and #18, and steps #260 and #270 are added. In the alternative embodiment, since steps #260 and #270 are added, an abnormality is detected and a warning is produced when the motorcycle stops without any detection of the brake operation signals FOBS and RBOS during N successive motorcycle stopping operations. When the brake operation signal FOBS or RBOS is not detected during the N successive motorcycle stopping operations, a warning flag BCAF expressed as signal SG5 in FIG. 11 is produced. It is to be noted that N is an predetermined integer that can be set by a manufacturer or by a user.

Referring to FIG. 5b, a flow chart for an alternative embodiment of the present invention shown in FIG. 5a is shown. Specifically, steps #46 and #47 in FIG. 5a are replaced by steps #48, sub-routine block S3-1, and step #49 in FIG. 5b.

In this alternative embodiment, when an abnormality in the antiskid brake control system is detected, it is possible to differ the warning lamp operation to blink or turn-on-and-off the warning lamp provided from the operations form the system's request. It is to be noted that the ON time of the blinking signal can be set and changed by changing the value of the Tp0 value as shown in FIG. 6.

Figure 8B:
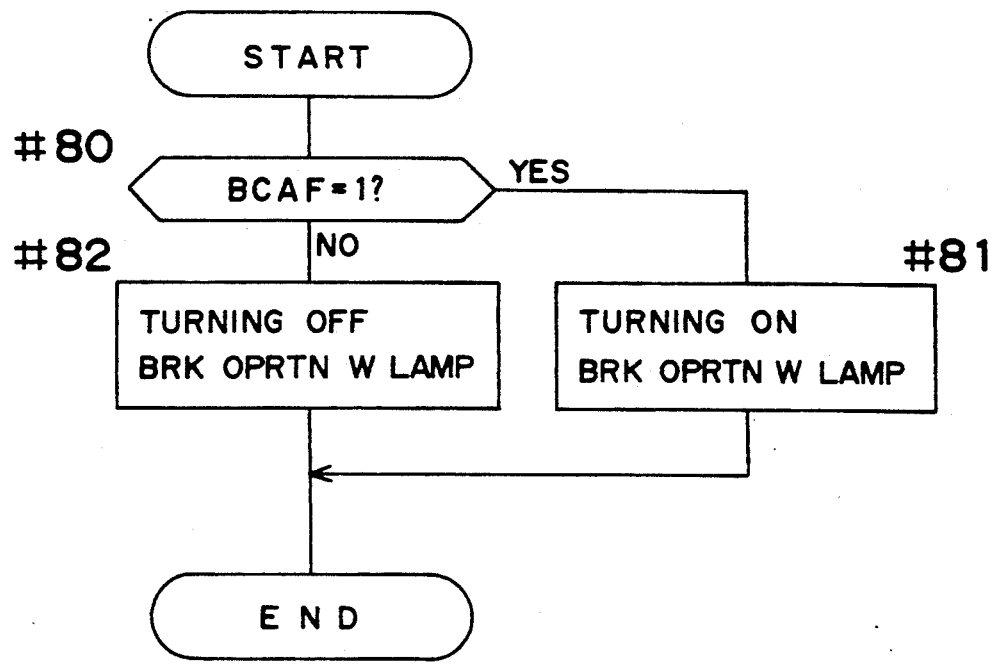

Referring to FIG. 8b, a flow chart for an alternative embodiment of the present invention shown in FIG. 8a is shown. Specifically, steps #83 and #84 and sub-routine block S5-1 in FIG. 8a are replaced by steps #80, #81, and #82 in FIG. 8b.

When a system abnormality is detected, the preferred embodiment associated with FIG. 8a is constructed to blink the brake operation warning lamp, but this brake operation warning lamp may also light steady as shown by this alternative embodiment.

Figure 11:
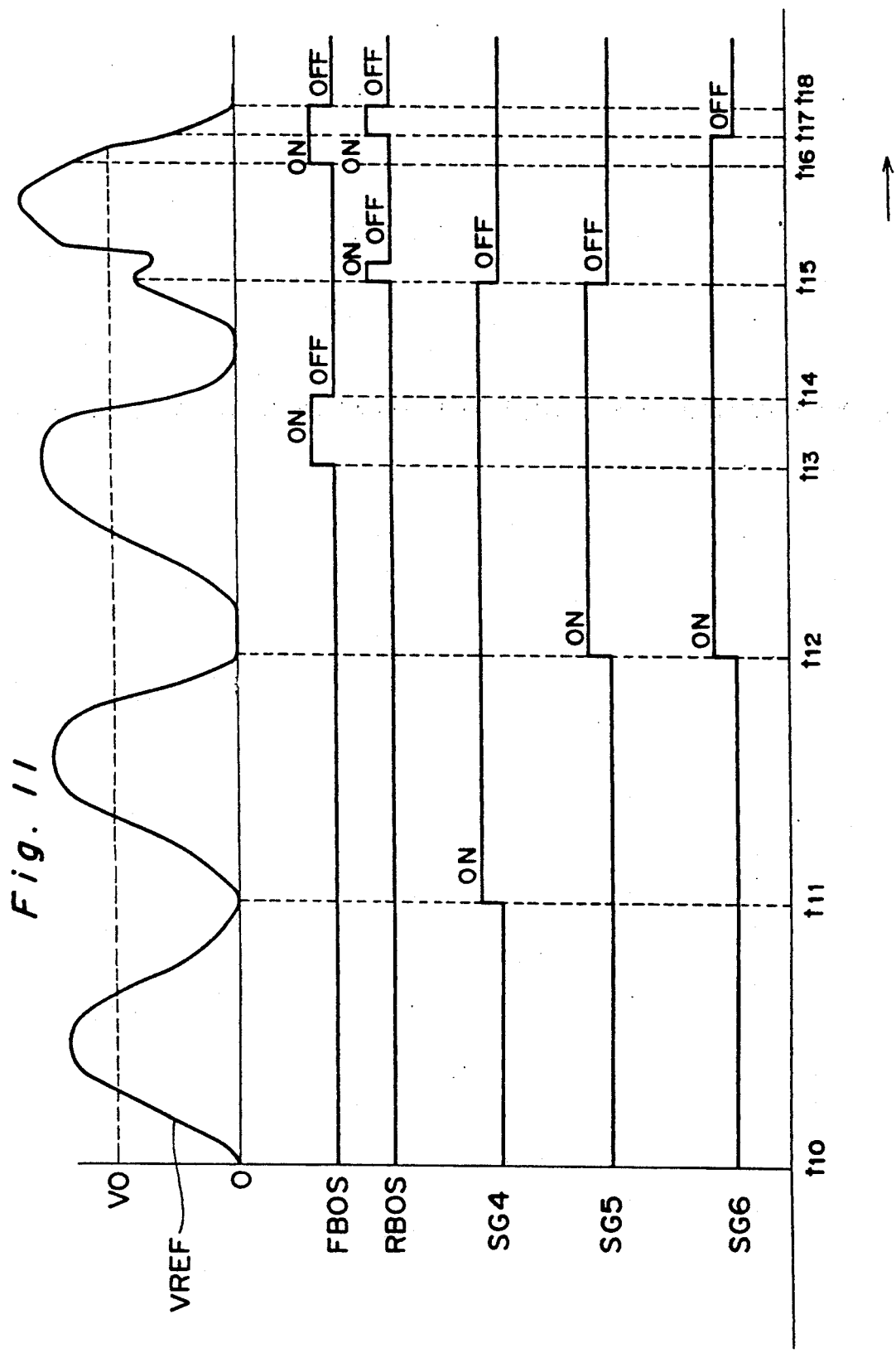

Signal SG4 in FIG. 11 shows the warning flag BCAF in the present embodiment where the warning flag BCAF is set when the motorcycle speed is reduced form Vo to zero without any detection of brake signals FBOS and RBOS; and is reset when both of brake signals FBOS and RBOS are detected, in the same manner as signal SG1 as described above in connection with in FIG. 10.

Signal SG6 in FIG. 11 also shows the warning flag BCAF in one of alternative embodiments where the warning flag BCAF is set when the motorcycle speed is reduced from Vo to zero repeatedly "N" times without any detection of brake signals FBOS and RBOS; and is reset when both of brake signals FBOS and RBOS are detected simultaneously.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A brake switch abnormality detection device for a vehicle having front and rear wheels, comprising:
   brake means operatively provided for applying a braking force to said front and rear wheels;
   brake switch means for producing a brake signal while said brake means is operated;
   calculation means for calculating an estimated vehicle speed;
   detection means for detecting the presence of said brake signal;
   comparison means for comparing said estimated vehicle speed with a first predetermined speed and a second predetermined speed, said first speed being greater than said second predetermined speed; and
   abnormality detection means for producing an abnormality signal when said detection means fails to detect the presence of said brake signal during at least one detection period which is from a time when said estimated vehicle falls below said first predetermined speed to a time when said estimate vehicle speed reaches said second predetermined speed.

2. A brake switch abnormality detection device according to claim 1, further comprising warning means for producing a warning in response to said abnormality signal.

3. A brake switch abnormality detection device according to claim 2, wherein said warning means comprises warning signal generation means for generating a warning signal and warning indication means for giving said warning in response to said warning signal.

4. A brake switch abnormality detection device according to claim 3, wherein said warning signal generation means produces a pulsating signal.

5. A brake switch abnormality detection device according to claim 3, wherein said warning signal generation means produces a constant signal.

6. A brake switch abnormality detection device according to claim 3, wherein said warning indication means comprises means for indicating said warning visually.

7. A brake switch abnormality detection device according to claim 6, wherein said visual indicating means comprises a system warning lamp.

8. A brake switch abnormality detection device according to claim 6, wherein said visual indicating means comprises an antilock warning lamp.

9. A brake switch abnormality detection device according to claim 3, wherein said warning indication means comprises audible means for indicating said warning audibly.

10. A brake switch abnormality detection device according to claim 9, wherein said audible means comprises an antilock warning buzzer.

11. A brake switch abnormality detection device according to claim 2, further comprising antiskid control means for controlling an antiskid control operation of at least one of said front and rear wheels, said antiskid control operation being disabled in response to said abnormality signal.

12. A brake switch abnormality detection device according to claim 1, wherein said abnormality detection means further comprises abnormality signal cancellation means for cancelling said abnormality signal when a brake signal is detected during a period in which said abnormality signal is produced.

13. A brake switch abnormality detection device according to claim 12, wherein said brake switch means comprises a front brake switch and a rear brake switch for producing a front brake signal and a rear brake signal, respectively.

14. A brake switch abnormality detection device according to claim 13, wherein said abnormality signal cancellation means cancels said abnormality signal when said front and rear brake signals are detected during a period in which said abnormality signal is produced.

15. A brake switch abnormality detection device according to claim 14, wherein said abnormality signal cancellation means cancels said abnormality signal when said front and rear brake signals are detected at instances that at least partially overlap.

16. A brake switch abnormality detection device according to claim 14, wherein said abnormality signal cancellation means cancels said abnormality signal when said front and rear brake signals are detected at separate instances during said period.

17. A brake switch abnormality detection device according to claim 13, wherein said abnormality signal cancellation means cancels said abnormality signal when either one of said front and rear brake signals is detected during a period in which said abnormality signal is produced.

18. A brake switch abnormality detection device according to claim 1, wherein said abnormality detection means produces an abnormality signal when said estimated vehicle speed is reduced from said first predetermined speed to said second predetermined speed at least twice without any detection of the presence of said brake signal.

19. A brake switch abnormality detection device according to claim 1, wherein said abnormality detection means produces an abnormality signal when said detection means fails to detect the presence of said brake signal during N successive stopping operations, wherein N is an integer.

* * * * *

UNITED STATES PATENT AND TRADEMARK OFFICE
CERTIFICATE OF CORRECTION

PATENT NO. : 5,199,770
DATED : April 6, 1993
INVENTOR(S) : M. YOSHINO et al.

It is certified that error appears in the above-indentified patent and that said Letters Patent is hereby corrected as shown below:

```
At column 2, line 41 change "switches" to ---switch---.
At column 4, line 5 change ""BCAF-1?"" to ---"BCAF=1?"---.
At column 4, line 23 change "sub routine" to
---sub-routine---.
At column 4, line 62 change ""RBRF2-1"" to ---"RBRF2=1"---.
At column 8, line 62 change "produce" to ---produced---.
At column 11, line 3 change "an to ---a---.
At column 11, line 14 change "form" to ---from---.
At column 11, line 31 change "form" to ---from---.
At column 12, line 2 insert ---speed--- after "vehicle".
```

Signed and Sealed this

Third Day of October, 1995

Attest:

BRUCE LEHMAN

Attesting Officer      Commissioner of Patents and Trademarks